United States Patent
Borel et al.

[11] 3,939,556
[45] Feb. 24, 1976

[54] LIQUID CRYSTAL CELL

[75] Inventors: Joseph Borel, Echirolles; Louise Peccoud née Toupillier, Claix; Jacques Robert, Grenoble, all of France

[73] Assignee: Commissariat a l'Energie Atomique, Paris, France

[22] Filed: June 7, 1974

[21] Appl. No.: 477,361

Related U.S. Application Data

[63] Continuation-in-part of Ser. No. 302,396, Oct. 31, 1972, abandoned.

[30] Foreign Application Priority Data
Nov. 4, 1971    France ................... 71.39513

[52] U.S. Cl. ............. 29/592; 23/230 LC; 29/25.13; 29/627; 316/19; 350/160 LC
[51] Int. Cl.² ............................................ G02F 1/00
[58] Field of Search .......... 29/588, 592, 627, 471.9, 29/472.9, 472.7, 473.1, 25.11, 25.13, 25.14, 25.15; 316/18–21; 350/160 R, 160 LC; 117/211, 212, 215, 217, 38, 106 R, 107, 119; 23/230 LC

[56] References Cited
UNITED STATES PATENTS

| | | | |
|---|---|---|---|
| 3,701,578 | 10/1972 | Krey ................................. | 316/18 X |
| 3,726,006 | 4/1973 | Muckelroy ....................... | 29/627 X |
| 3,778,896 | 12/1973 | Bagby ............................. | 29/472.9 X |
| 3,807,833 | 4/1974 | Graham et al. ................. | 350/160 LC |

*Primary Examiner*—C. W. Lanham
*Assistant Examiner*—Joseph A. Walkowski
*Attorney, Agent, or Firm*—Cameron, Kerkam, Sutton, Stowell & Stowell

[57] ABSTRACT

A liquid crystal cell is made by covering a wafer with an electrode system. A second insulating and transparent wafer is covered with a second system of semi-transparent electrodes. A wall of controlled thickness is deposited on a wafer around a periphery thereof. A metallic thread is deposited on a wafer with the same perimeter as the wall. The wafers are applied to each other and heated to fuse the thread on the top of the wall to join and seal the wafers with a liquid crystal between them within the wall.

2 Claims, 7 Drawing Figures

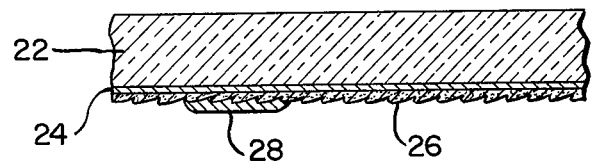
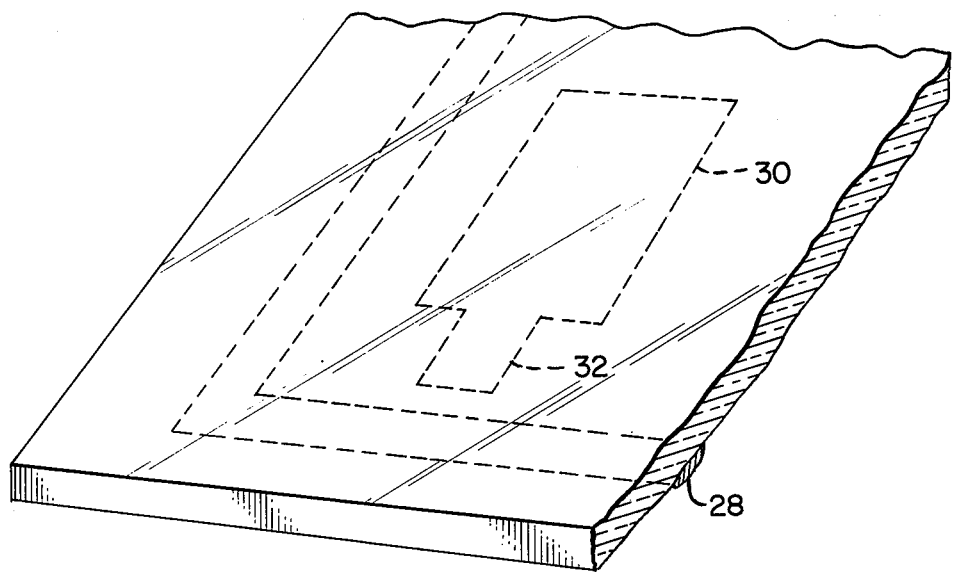
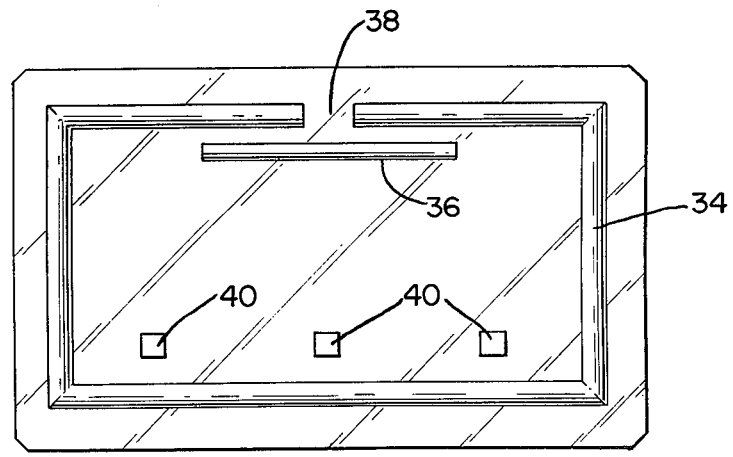

LIQUID CRYSTAL CELL

REFERENCE TO RELATED APPLICATION

This application is a continuation-in-part of our application Ser. No. 302,396 filed Oct. 31, 1972 for Liquid Crystal Cell which application is to be abandoned.

BACKGROUND OF THE INVENTION

The present invention has for its object a process for making liquid crystal cells. These cells find use in the manufacture of display apparatus.

A liquid crystal cell is generally made up of a film of liquid crystals positioned between two wafers of glass covered with conducting deposits which are transparent or reflecting. These deposits play the role of electrodes and define the alpha-numeric characters or other characters that are to be displayed. A thin wall of a thickness of about one 10th of a micron is located between the two wafers and around the electrodes to provide the desired separation and insulation between the two wafers and to seal the cell.

Manufacture of such a cell has several problems. The wall must have a constant thickness to maintain good parallelism between the two wafers to obtain correct electro-optical performances both in the static regime and in the transatory regime. The filling of the cell with the liquid crystal must avoid all pollution or formation of bubbles. The sealing between the elements of the cell must be of good quality to obtain perfect tightness which determines the length of the life of the cell.

In known liquid crystal cells the wall is of a material of the epoxy-resin type which polymerizes at about 400° C. In accordance with the known art, a thin layer of this product is deposited around one of the two wafers. The two parts of the cell are then applied one on the other and raised to a sufficiently high temperature so that the resin polymerizes. Filling is carried out by lightly heating the cell, first placed under vacuum, filling the cell through an opening in the layer of resin in one side of the cell and then closing the opening in the layer of resin. The final sealing of the cell consists in closing the opening by an appropriate plug.

This process of manufacture has several inconveniences. The two principal ones are that the process is not an acceptable industrial manufacturing process and the process does not provide cells having closely reproducible characteristics from one cell to the next and this introduces great difficulties in the control of the cells relating to a single display panel.

BRIEF DESCRIPTION OF THE INVENTION

The present invention has for an object a process of manufacture of liquid crystal cells which do not have the inconveniences above noted and which includes a series of steps which can be easily accomplished entirely automatically and therefore are industrially important for producing cells of uniform quality such that they can be easily controlled by multiplexing.

The present invention is therefore essentially characterized in a process in which a wall of substantially constant thickness is provided for the cell by evaporation of a material under vacuum, the wall having at its upper surface a thin layer of a material having a low fusion point for joining of the two wafers of the cell without excessive elevation of temperature.

More precisely, the present invention relates to a process for the manufacture of liquid crystal cells having a liquid crystal film interposed between a first wafer covered with a first electrode system and a second wafer covered with a second system of transparent electrodes. In a first embodiment of the invention on a least one of the wafers provided with its system of electrodes a wall of controlled thickness is desposited through a first mask arranged at the periphery of the wafer. There is then deposited, through a second mask on at least one of the wafers treated as above described, a thread of a material of low fusion point along the length of the corresponding periphery of the wall. The two wafers then are applied to each other in such a way that the thread is applied to the top of the wall and the two wafers are then joined to each other by heating the low fusion point material to its point of fusion.

In accordance with the present concept, a wall and a thread on the wall can be deposited on each wafer. Further, the wall can be deposited on one wafer and the thread deposited on the other wafer or a wall and a thread on a wafer and a thread only on the other wafer.

Preferably, the wall and/or the material having a low fusion point are deposited by evaporation under vacuum. These two operations of deposit can advantageously be carried out in the same enclosure in accordance with known techniques of evaporation under vacuum.

Preferably, the material deposited on the wall is a metal selected from the group consisting of indium, lead, tin, selenium and their alloys.

The material making up the wall can be a metal, but advantageously it is insulating and can be, for example, silicon oxide.

In a preferred embodiment, the wall is silicon oxide and the metal of low fusion point is indium.

In accordance with another embodiment, the present invention includes the following steps:

a. On one of the wafers covered with its electrode system, there is deposited through a first mask at the periphery of the wafer a wall of controlled thickness;

b. There is then deposited on at least one of the two wafers a metallic ribbon of the same perimeter as the wall;

c. The two wafers are then applied to each other in such a way that the ribbon engages a top of the wall;

d. The two wafers are then joined to each other by heating to fuse the metallic ribbon.

REFERENCE TO THE ACCOMPANYING DRAWINGS

The process of the present invention will be described with reference to the accompanying drawings in which FIG. 1 is a schematic representation of the lower plate of a liquid crystal cell made in accordance with the present invention;

FIG. 3 shows in cross-section the upper plate of a cell made in accordance with the present invention;

FIG. 4 is a perspective view of the plate of FIG. 3;

FIG. 5 shows a particular form of the wall;

DESCRIPTION OF THE PREFERRED EMBODIMENTS

Figure 1:
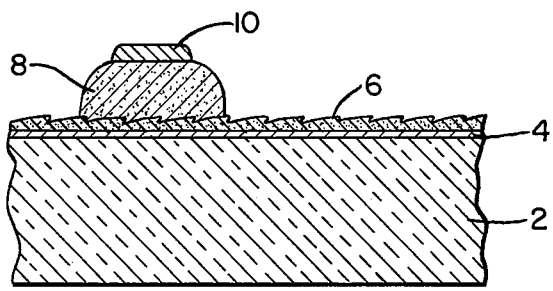

While the present invention is not limited to these materials, the description of the first embodiment will include the case where the cell has a wall of silicon oxide SiO associated with a metal of low fusion point, indium.

Silicon oxide SiO is a particularly good material for use as the wall since it has the following characteristics:
 a. it has very good electric insulating properties;
 b. it provides good sealing for the liquid;
 c. it has good compatibility with the other neighboring materials such as glass and indium oxide which avoids cracking;
 d. deposit in relatively thick layers is carried out without creation of internal stresses;
 e. evaporation under vacuum occurs at low temperature which permits the use of a crucible of tungsten or of molybdenum and avoids the use of any electron gun necessary for material such as silica or alumina; and
 f. it is of solid and massive form and remains so during evaporation which avoids a-1 pollution of the enclosure.

In the first embodiment of the invention the different steps of manufacture of the cell are:
 1. cleaning of the glass wafers which support the electrode systems;
 2. deposit on each glass wafer layers of transparent conductive materials, for example $In_2O_3$ or reflecting layers, Al, Cr or Au;
 3. engraving the electrodes by ionic or chemical means to define the profile of the characters to be displayed;
 4. treatment of the surface of the wafers so that they provide an appropriate orientation for the molecules of the liquid crystal. This treatment for example, as is known, can be a deposit of SiO at an oblique angle of incidence. This treatment may also be a tempering in a surfactant;
 5. deposit, in accordance with the invention, of a closed wall, or a wall provided with an opening, of SiO on the two wafers or on one of the two wafers depending on whether two semi-walls or a single wall are desired;
 6. deposit of a low fusion point material, for example indium, on the top of the wall, on the upper wafer or on the two tops of the two half walls.

When the wall is provided with an opening for filling, the final operations are then:
 7a. positioning of the two wafers on each other;
 8a. joining the two wafers by heating of the fusible material to fusion, either by introducing the cell in a furnace or by heating the fusible material by infra-red rays or by radio frequency or by laser beam;
 9a. introduction of the liquid crystal in the cell by heating the cell under vacuum and then submerging the cell in a bath of liquid crystal;
 10a. closing of the opening in the wall after filling the cell;
 11a. heating the cell and reinforcing its rigidity by a ribbon of glue.

In the case where the wall is completely closed, filling and the end of the process is carried out as follows:
 7b. deposit of liquid crystal on one of the two wafers;
 8b. positioning the two wafers one on the other;
 9b. joining the two wafers as in step (8a), this operation being carried out preferably under vacuum;
 10b. cleaning the cell and reinforcing the rigidity of the cell as in step (11a).

The steps of depositing the SiO and indium are advantageously carried out by evaporation under vacuum but it is within the scope of the present invention to utilize other techniques such as serigraphics, for example.

FIGS. 1 to 4 show the results of each of the different steps of the process in accordance with the present invention. In FIG. 1 glass wafer 2 of the cell has deposited thereon a conductive layer 4, for example of $In_2O_3$ forming the system of electrodes for the lower wafer, and a surface treatment layer 6, for example, an oblique deposit of SiO sufficiently thin so that layer 4 will not be completely electrically insulated from the liquid crystal. Wall 8 is surmounted by a low fusion point material 10.

If the mask which is used to obtain wall 8 is of good quality, in particular if the edges are cut with precision, the mask can be utilized for deposit of materials 8 and 10. But it is sometimes preferable to utilize a second mask, thiner than the first, to deposit material 10.

Figure 2:
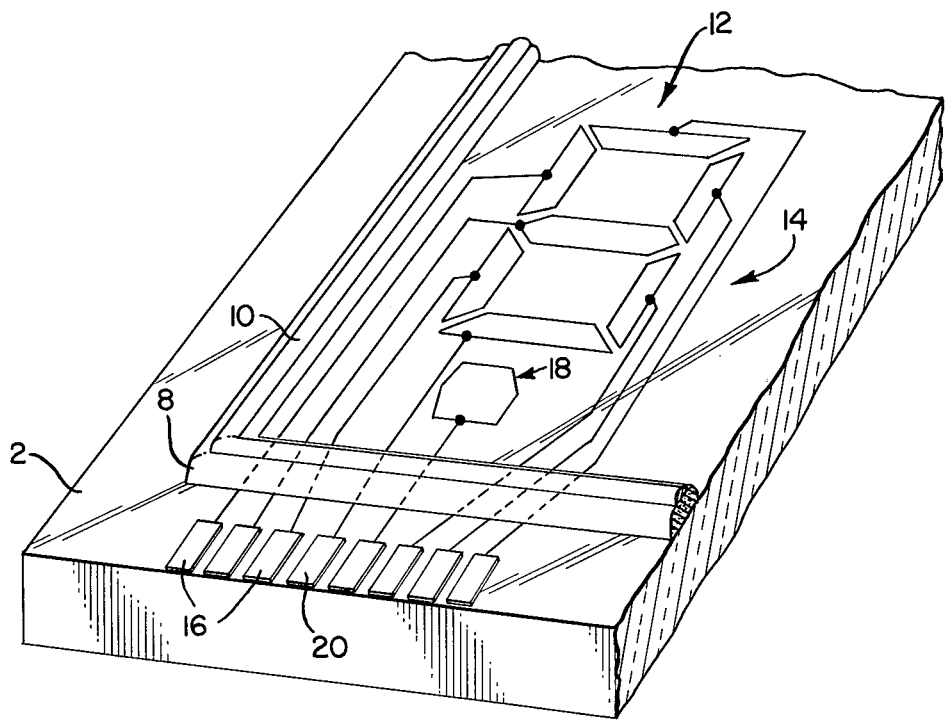
FIG. 2 shows this lower plate in perspective with its electrical connections.

FIG. 2 shows the same elements as FIG. 1 utilizing the same reference numbers with, structure 12 having seven segments connected by connections 14 to contacts 16 for connection of the cell to the electronic control elements, not shown.

FIG. 2 also shows a contact carrying member 18 obtained by the deposit step under vacuum and constituted by insulating material covered with the material of low fusion point covering the top of the wall. This contact serves, as will be described hereinafter, to electrically connect the electrodes of the upper wafer to contact 20 mounted on the lower platter.

The upper wafer of the cell is seen in FIG. 3. Glass wafer 22 has deposited thereon a conductive layer 24, for example of $In_2O_3$, then a layer 26 to orient the molecules of the liquid crystal, for example, oblique SiO and then a ribbon 28 of a low fusion point material, preferably indium. As noted above, a half-wall of SiO can be deposited on the upper wafer analagous to wall 8 of FIG. 1 with a ribbon of indium thereon.

FIG. 4 shows the upper wafer of the cell in perspective showing the counter electrode 30 the location of which corresponds to element 12 of the lower wafer. Counter electrode 30 is extended by a zone 32 which, when the cell is assembled, comes in contact with contact 18 and provides an electric connection of counter electrode 30 with contact 20. It is advantageous to utilize a mask which permits deposit of the metal on member 18 of such a size that the metal entirely covers the insulating part of this member.

It goes without saying that this method of obtaining contact with the counter electrode of the upper wafer is exemplary only and that it is within the scope of the present invention to obtain the electric connection to counter electrode 30 by a connection situated entirely on the upper wafer.

Wall 8 which provides sealing and thickness for the cell, is not necessarily rectangular. It can have more complex forms which may improve the filling operation and avoid pollution of the liquid crystal by the plug which is used to close the opening in the wall. The present invention applies equally to any shape of the wall. By way of illustration and not of limitation, FIG. 5 shows a particular wall form having a main rectangular wall 34 associated with an auxiliary wall 36 to partially mask opening 38 used during filling. Contacts 40 are provided for the counter electrodes located on the upper wafer, three in the example considered, for display apparatus which has three numerical characters disposed side by side.

Figure 6:
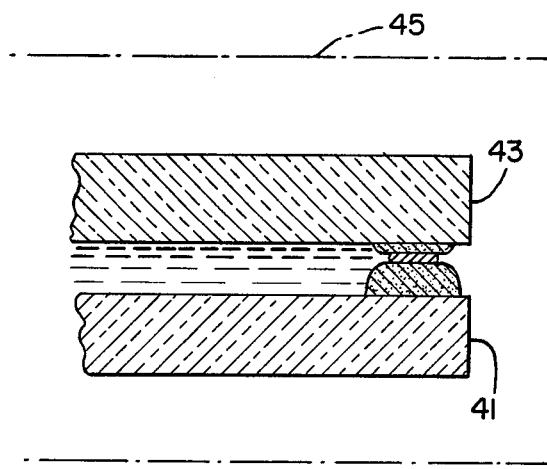
FIG. 6 shows schematically the position of the plates during fusion of the metal.

FIG. 6 shows very schematically the position of the lower wafer 41 and upper wafer 43 disposed in a furnace 45 providing a temperature in the neighborhood of the fusion point of the material located on top of the wall, for example, between 100° and 200° C. for indium. Several cells can be treated in the same furnace. Naturally, FIG. 6 is not to scale.

Figure 7:
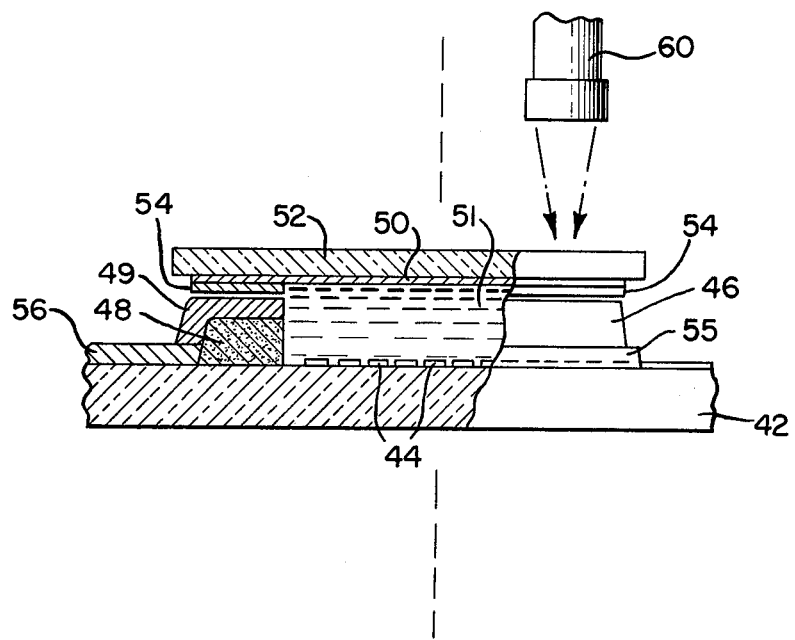
FIG. 7 illustrates a second embodiment in which the thread of solder is a metallic ribbon.

FIG. 7 shows another embodiment of the process of the present invention in which a ribbon is used for the junction.

The cell shown in FIG. 7 filled with liquid crystal 51 comprises:

a. a base wafer covered with coating 44 or mosaic and conductor of electricity, constituting a mosaic of electrodes;

b. a transparent layer 52 of glass parallel to wafer 42 forming a cover and covered with an extremely thin layer 50 of a transparent metal constituting a second electrode;

c. a closed wall forming the lateral wall of the cell and mounted between wafers 12 and 52.

In accordance with an embodiment shown at the left of FIG. 7, the wall comprises, considered in the direction of its thickness between wafers 42 and 52, a metallic part 49 and a part 48 of insulating material for example, $SiO_2$, $Si_3N_4$ or $Al_2O_3$. The total thickness of the wall is from 10 microns to about 1 micron and the thickness of the metallic part 49 is small with respect to that of the insulating part 48 and on the order of 1 micron. A ribbon 54 is deposited on wall 49 and on wafer 52.

Metallic part 49 is electrically connected to a metallic contact 56 applied against base 42 so that there is electric continuity between layer 50 and contact 56.

A difference of potential can be applied by a voltage generator and an interrupter, now show, between certain of the electrodes of the mosaic 44 and contact 56 and thus between certain of the electrodes of the mosaic 44 and the metallic layer 50, this difference of potential creating an electric field between the wafers 42 and 52.

In accordance with an embodiment of the invention shown at the right of FIG. 7, wall 46 is entirely metallic. On conducting layer 50 of upper wafer 52 a metallic ribbon 54 is deposited closed on itself and of the same length as wall 46. It is interesting, in the forming of ribbon 54, to utilize the same mask that is used to form the wall. This ribbon can be of aluminum or of gold. Wafer 56, thus treated, is mounted on the wall in such a way that the two metallic parts are in contact with each other, the cell being full of liquid crystal.

This metallic junction is heated locally either by a laser beam 60 or by ultrasons (ultra sonic waves) or by any other appropriate means in such a way as to locally melt the aluminum-aluminum junction, if ribbon 54 is of aluminum, or to create the eutectic aluminum-gold, if the ribbon is of gold.

The thickness of ribbon 54 can be on the order of 1 micron.

The cell manufactured by the process of the present invention is particularly useful for display apparatus utilizing a control circuit of the integrated type with M.O.S. transistors.

This integrated circuit may then constitute the base 44 of the cell.

It will be appreciated from the above description of the illustrative embodiments that the present process utilizes techniques such as evaporation under vacuum and masking to obtain walls of controlled thickness with great accuracy and that these procedures can be automatically performed. The present invention therefore contributes to reduction of cost of display apparatus using liquid crystals.

As a result of the accuracy with which, in accordance with the present invention, such cells can be manufactured, it is easy to control several cells disposed in the display assembly, for example, by sequential signals which is not the case with prior art procedures which produce unacceptable variations in the performance of the different cells and in particular by reason of inequalities in the thickness of the cells. It follows from the multiplexing of the cells that a decrease is obtained in the number of electrical control connections of a group of cells. More precisely, if it is desired to control $n$ cells with seven segments by a multiplexing process, it is possible to utilize only seven connections carrying the sensitizing signal and a connection for each cell connected to the counter electrode of the upper wafer, these electrodes being sequentially energied. The number of connections in this case will then equal $7+n$. On the other hand if multiplexing is impossible, each cell must be controlled independently by seven connections which leads to a total of $7n$ connections plus a connection to simultaneously control the $n$ counter electrodes of the upper wafers. The difference between $7+n$ and $7n+1$ is considerable when the number of characters to be displayed is greater than three or four.

What we claim is:

1. Process for the manufacture of a liquid crystal cell having a film of liquid crystal between a first wafer, covered with a first system of electrodes and a second transparent wafer covered with a second system of transparent electrodes, the steps of mounting a system of electrodes on at least one of the wafers, depositing through a first mask on the periphery of the wafer a wall of controlled thickness, depositing through a second mask on at least one of the wafers a thread of material of low fusion point around a periphery corresponding to the periphery of the wall, applying the two wafers against each other and applying the thread on the top of the wall, connecting the two wafers to each other by heating the material of low point of fusion to the point of fusion, said step of depositing the wall including evaporation under vacuum in an enclosure of the material constituting the wall and said step of depositing said thread including evaporation under vacuum in said enclosure of the material of low point of fusion.

2. Process as described in claim 1, including the step of forming on the wafer within the interior of the perimeter of the wall an electric contact of the same material as the wall and of the same height as the wall by depositing the electric contact through a mask provided with an opening and then completely covering the electric contact with a metal identical to the low fusion point material.

* * * * *